even though the valve
United States Patent
Magdars

[15] 3,670,763
[45] June 20, 1972

[54] SEMIAUTOMATIC HOSE RACK
[72] Inventor: John T. Magdars, Northbrook, Ill.
[73] Assignee: General Fire Extinguisher Corporation
[22] Filed: Feb. 19, 1971
[21] Appl. No.: 116,966

[52] U.S. Cl. .................................. 137/355.18, 137/355.28
[51] Int. Cl. .................................. B65h 75/34, B65h 75/38
[58] Field of Search .................. 137/355.16, 355.18, 355.2, 137/355.26, 355.28

[56] References Cited

UNITED STATES PATENTS

| 1,004,461 | 9/1911 | Nuhring | 137/355.16 X |
| 1,156,706 | 10/1915 | Nuhring | 137/355.18 |
| 1,658,793 | 2/1928 | Hansen | 137/355.18 |
| 2,214,761 | 9/1940 | Cornell | 137/355.18 |
| 2,719,752 | 10/1955 | Dodge, Jr. et al | 137/355.18 |
| 2,756,101 | 7/1956 | Cauffman | 137/355.18 |
| 2,993,503 | 7/1961 | Pokryfke et al | 137/355.18 |
| 3,338,260 | 8/1967 | Thompson | 137/355.28 |
| 3,422,839 | 1/1969 | Svenson | 137/355.18 |

*Primary Examiner*—Samuel Scott
*Attorney*—Hofgren, Wegner, Allen, Stellman & McCord

[57] ABSTRACT

A fire fighting water hose rack of the type capable of storing a long collapsed hose compactly in upright folded loops draped over a plurality of support links which sequentially release such loops as the hose is withdrawn from the rack, outer end first. The rack is mountable adjacent a water supply pipe with the hose connected downstream of a valve. The hose rack has an improved clamping means for temporarily closely off the flow of water through the loops until the hose is drawn out of the rack and substantially straightened, even though the valve is opened.

5 Claims, 5 Drawing Figures

PATENTED JUN 20 1972 3,670,763
SHEET 1 OF 2

Inventor:
John T. Magdars
By Hofgren, Wegner,
Allen, Stellman & McCord
Attys 3,670,763

SEMIAUTOMATIC HOSE RACK

BACKGROUND OF THE INVENTION

1. Field of the Invention

This invention relates to fire hose racks of the semiautomatic type adapted to support a collapsed fire hose folded in serpentine fashion and to readily successively release the folds whenever a pull is exerted on the nozzle end of the hose to withdraw the hose endwise from the rack. More particularly this invention is directed to a fire hose rack of the type described having an improved clamping device for closing off the flow of water through the loops until the hose is drawn out of the rack and substantially straightened.

2. Description of the Prior Art

In semiautomatic hose racks of this type, the folds of the collapsed hose are generally supported upon a series of swivel mounted links arranged in a row with the links parallel and having their free ends resting upon a common supporting rail on the rack. When the hose is pulled in the direction crosswise of the links, the free ends of said links will successively slide off the supporting rail and disengage from folds of the hose to free the hose from the rack.

It is a requirement of semiautomatic devices of this character that the water may be admitted into the hose through the valve at the main before the hose is removed from the rack. A temporary stop should retain the water in the first loop or so of hose hung on the rack withstanding a pressure of 150 p.s.i., without pressurizing the rest of the hose on the rack toward the nozzle, so that the water pressure has no opportunity to charge the hose making it dangerous to handle. Semiautomatic hose racks are intended for emergency operation when there may be only one person available. A lone person should be able to open the valve admitting water to the hose at full pressure, then grasp the nozzle, detach it from its holder, and pull upon the nozzle to withdraw the hose from the rack stretching it out toward the fire, without any flow of water through the hose until substantially the entire length of hose has been laid out. If the one person were required to lay out the hose, then return to the standpipe and open the valve, and then return to the nozzle discharging water without direction, much valuable time would be lost. If the valve is opened first and the water is allowed to flow through the hose before it has been fully detached or released from the rack, swelling of the hose due to the water pressure might cause it to bind in the rack and thereby interfere with or even prevent removal of the hose in an emergency. It can also be appreciated that if the water valve were opened prior to the straightening of the hose, in the operation just described, the force of the water pressure through the hose might make the nozzle an unpredictable missile which could cause bodily harm to the user.

In the past, various disclosures have been made of structures supposed to secure a hose in the rack of the semiautomatic type, in which the operator could first turn on the water valve, while laying out the hose up to the last few loops and then by quick pull on the hose itself, not only release the remainder folds from the rack, but at the same time allow the water to flow through the full length of the hose from the valve at full pressure. Examples of such semiautomatic hose racks are shown in U. S. Pat. Nos. 1,658,793, 2,719,752 and 2,756,101. However, the attempts of the earlier devices to attain these objectives have not been able to confine the water in the manner set forth above, or, if a successful means for holding the water was provided, it was impossible to release the last fold unerringly so as to permit the full flow of water.

SUMMARY OF THE INVENTION

It is the principal object of the present invention to provide a hose rack of the general character and for the general purposes described above which is easier and safer to operate than it has heretofore been known. More particularly, the object of this invention is to provide an improved clamping means for temporarily closing out the flow of water through the hose loops until the hose is substantially all drawn out of the rack and the last loop is being straightened from its stored position.

The clamping means generally has a pressure plate extending over the link which is closest to the water supply. A cam member is disposed over the plate and is mounted to move the plate toward the link and pinch a hose section draped over the link thereby closing off the flow of water through the hose section. The cam member has a handle extending downwardly between the hose loops which is swingable upwardly in a downstream direction in response to a force exerted on the handle by the adjacent hose loop during straightening when the hose is being pulled from the rack. The cam member and handle are arranged relative to the pressure plate to clamp the hose between the plate and link when the handle is in the downwardly position and release the clamping action on the hose when the handle is swung upwardly by the pulling of the hose from the rack.

In a preferred embodiment of the invention, the cam member is a cylinder eccentrically mounted for rotation against the upper side of the pressure plate to force the plate downwardly in the specified clamping attitude against the hose and underlying link.

The hose rack may be supported in an easily accessible position by a base surrounding an upright water supply pipe. Such a base provides a convenient support for the rack and the clamping mechanism which should be near the water pipe and valve. The pressure plate is elongated and has one end loosely engaging under a portion of the base next to the water pipe. The plate extends outwardly over a part of the rack toward a free end opposite such engaged end with an intermediate portion overlying the first hose loop. The plate has an elongated open slot extending from the free end towards the bearing portion for admitting the cam handle therein when it is swung to the downward position to rest beside a downwardly hanging hose portion draped over the first link.

In a preferred embodiment of the invention, the hose supporting links are slidably mounted over a pair of parallel spaced apart horizontal rails extending outwardly from the base. In this manner, at least one end of each link will fall away from its supporting rail when the link has been moved to the downstream end of the rails by pulling of the hose from the rack thus releasing the hose from its stored portion in the rack. Such hose releasing operation has been utilized heretofore.

DESCRIPTION OF THE PREFERRED EMBODIMENT

Figure 1:
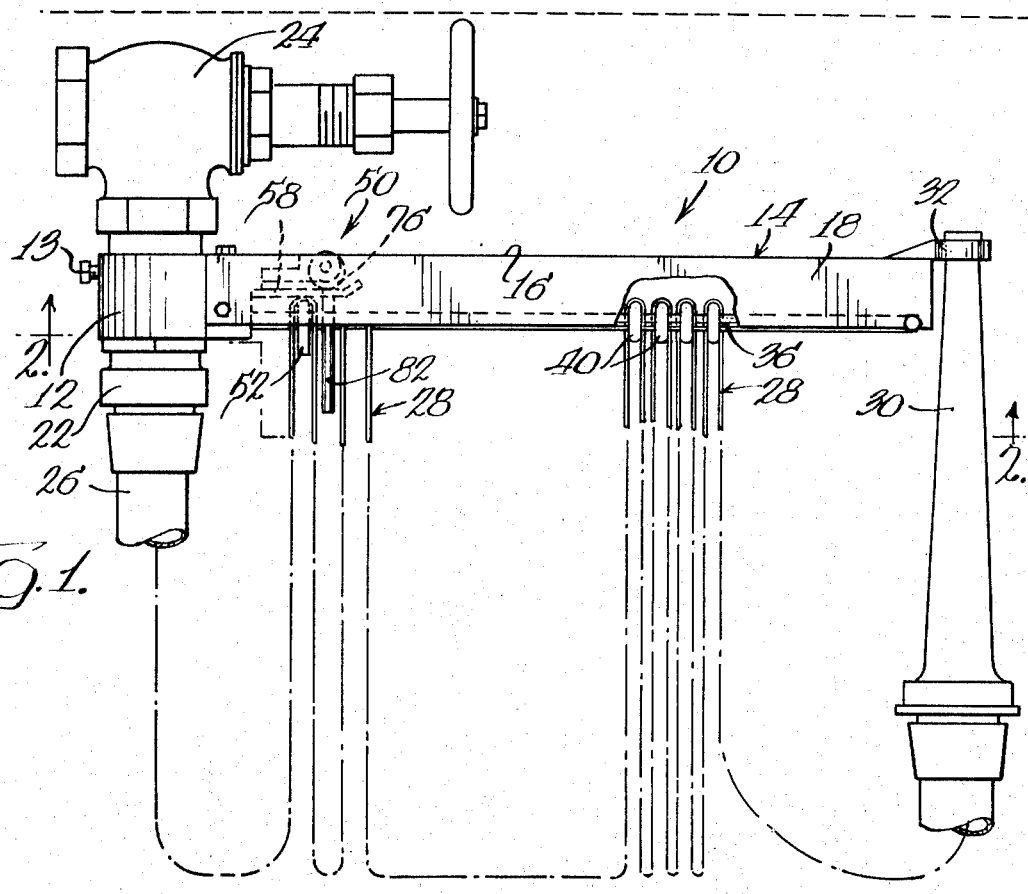
FIG. 1 is a broken, upright elevational view of the semiautomatic hose rack incorporating the clamping means of this invention, and showing the collapsed hose in stored position in the rack.

Referring to FIG. 1, the body 10 of a semiautomatic hose rack includes a base 12 and a hood 14 extending outwardly therefrom. The hood 14, which is generally channel-shaped, is constructed of sheet steel or other suitable material and comprises a flat horizontal top wall 16 with depending sides 18 and 20 to decorate the rack and provide support for hose supporting structure as well as a dust cover for the hose.

The base 12 has an opening formed by cylindrical wall 22 to receive a pipe, riser extension or valve nipple in order to mount and support the rack on the water pipe or some extension thereof. A hose 28 has a suitable coupling equipped end 26 to connect to the water supply. At its downstream end, the hose 28 has a nozzle 30, and a spring clamp 32 releasably supports the nozzle 30 on the forward end of the hood 14. The base 12 is clamped to its embraced pipe by a set screw 13 to hold the rack in an outstanding position. Usual mechanism or a pipe nipple may be employed to allow the rack to swing in an arc if the surroundings in which the rack is to be used require such swinging to facilitate removal of the hose from the rack in case of fire.

Figure 2:
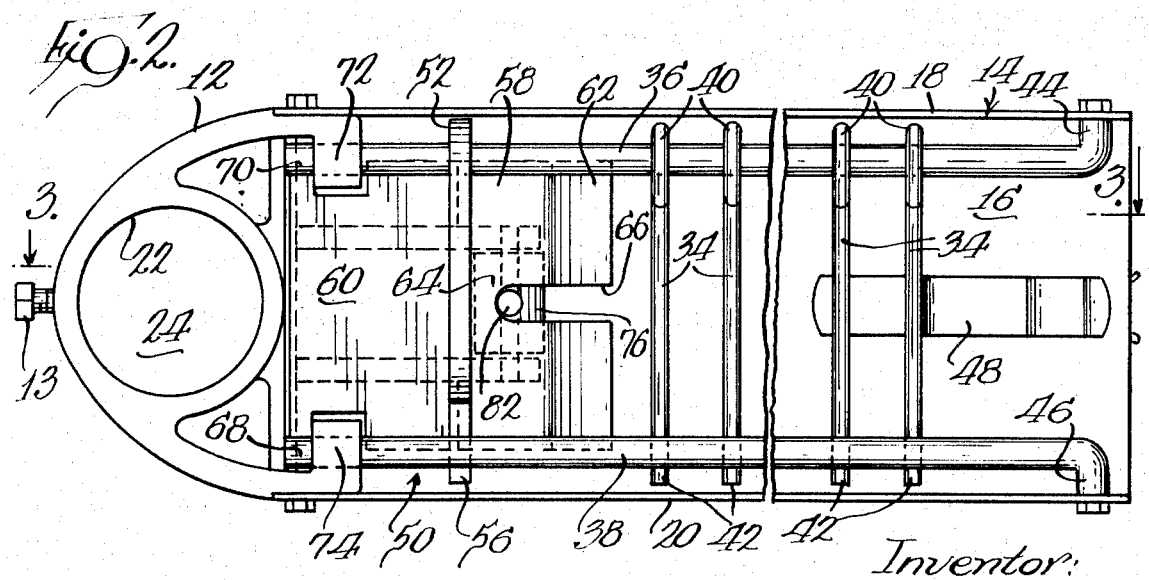
FIG. 2 is a broken, enlarged bottom plan view taken generally through the line 2—2 of FIG. 1 with water pipe, valve and hose removed for clarity of illustrating the invention.

The length of hose 28 intermediate its upstream and downstream ends is folded in serpentine fashion and all of these folds are supported on a plurality of readily releasable temporary support links 34. The links 34 may be of formed wire construction, transversely slidably supported over a pair of parallel spaced apart horizontal rails 36 and 38 which extend outwardly from the base 12 under the hood 14 as can best be seen in FIG. 2. The links 34 which extend nearly the full width of the hood 14, are formed with loops 40 which are slidably and rotatably mounted on rail 36. The other end of each link 42 is free and rests on rail 38 for support. At the most forward end of each rail 36 and 38 a right angle bend portion 44 and 46 is secured to the hood side wall 18 and 20 respectively.

When the nozzle end of the hose 28 is pulled forwardly in a direction generally lengthwise of the hose rack, the links 34 swing off rail 38 while their swivel connections to rail 36 allow them to drop down successively in a vertical position out of the way of the folds of the hose to quickly release the hose 28 from the rack. Premature disengagement of the links from hose supporting relation to the rails is prevented by a retainer 48 in the form of a leaf spring held at its inner end to the hood 14. Each link 34 must raise the retainer 48 against the latter's spring resistance in order to pass outwardly to a position to release the hose section such link carries. Accidental or inadvertent dislodgment of all of the links at once is prevented but not their sequential dislodgment in the intended manner.

When the hose 28 is being pulled out of the hose rack with the water supply valve 24 open, it is essential that the hose 28 be clamped firmly adjacent the base 12 to prevent flow of water into the majority of the hose so as to permit the maximum length of hose to be pulled out of the rack before the water is permitted to reach the nozzle 30. To this end, a clamping means, generally designated 50 is provided which is more clearly shown in FIGS. 2–5.

The link 52 closest the base 12 is intended to cooperate with the clamping means to resist water pressure in the hose. Link 52 is provided in the form of a relatively thick metal bar having a generally oblong shaped slot 54 (FIG. 4) formed therein adjacent one end substantially similar in shape to the loop 40 in the wire formed links 34. Link 52 is slidably and rotatably mounted and retained on the rail 36. At its opposite end, i.e., at its left hand end as viewed in FIG. 4, the link 52 is formed with a finger 56 which may rest upon rail 38 when supporting a section of the fire hose.

Extending over the special link 52 is a pressure plate 58 which is loosely secured to the base 12. The pressure plate 58 extends from the base in a disposition shown in FIG. 5, i.e., slightly upward. The pressure plate 58 has one end 60 loosely engaging the base, a free end 62 opposite such engaged end and a bearing portion 64 intermediate the ends overlying the first link 52. An elongated open slot 66 extends from the free end 62 of the pressure plate toward the bearing portion 64 for reasons which will become more apparent hereinafter. The plate 58 has a pair of opposite side ears 68 and 70 which fit loosely about correspondingly shaped projections 72 and 74 formed on the base. The plate 58 is assembled to the base 12 prior to assembly of the rails 36 and 38 so that placement of the rails may serve to retain the plate 58 assembled with the base 12, albeit quite loosely so that the plate 58 may move sufficiently to accommodate itself to the hose 28 and underlying link 52 to perform the intended clamping function.

A cylindrical cam member 76 is eccentrically mounted between two spaced apart ears 78 and 80 on the base and over the bearing portion 64 of the pressure plate for rotation against the upper side thereof. The axis about which the cam member 76 rotates is such that the rotation of the cam member 76 will move the plate 58 against the special link 52 and assume an over-center position tending to prevent accidental release of clamped relation. The cam member 76 has a handle 82 extending outwardly therefrom and which is swingable downwardly through the open slot 66 in the pressure plate 58. The handle 82 serves two purposes, it provides a means by which the cam member 76 may be manually rotated and a mechanism upon which the hose operates to unclamp the cam and plate from the hose. The handle 82 also limits the rotation of the cam member 76 to approximately 90°, generally between those positions shown in FIGS. 3 and 5.

Figure 3:
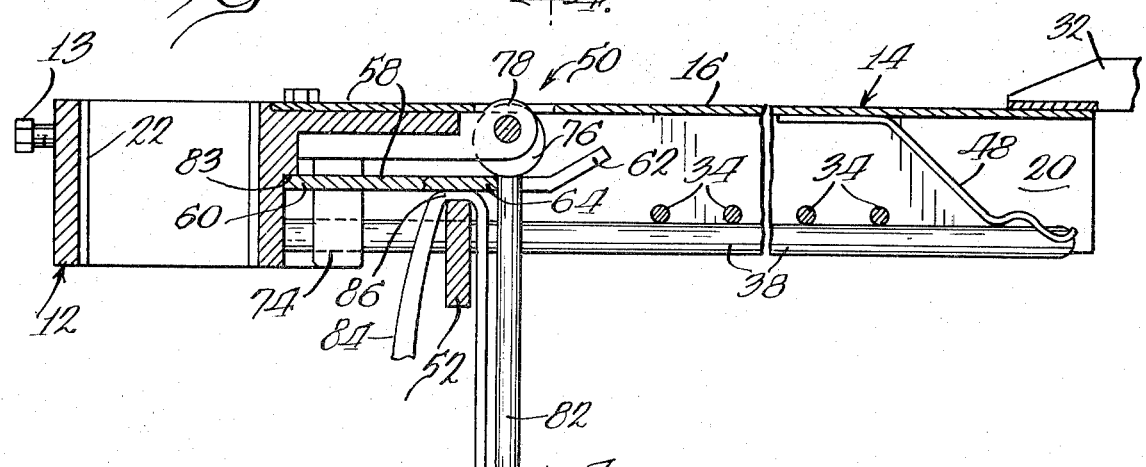
FIG. 3 is a broken sectional view of the portion of the rack shown in FIG. 2 taken generally along the line 3—3 showing the clamping means in an operative position.
Figure 4:
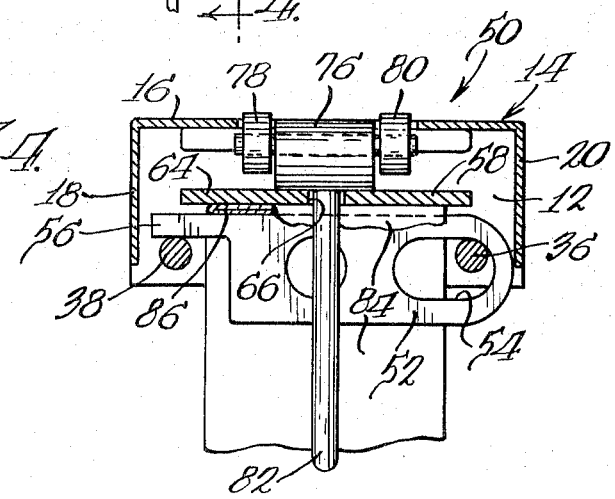
FIG. 4 is a fragmentary sectional view taken generally along the line 4—4 of FIG. 3 looking toward the clamping means.

In FIG. 3, the clamping means 50 is shown in such a position that the cam member 76 has assumed an over-center position. When the clamping means 50 is in this position, plate end 64 bears upwardly against ledge 83 of the base 12 while the plate bearing portion 64 pinches a hose section 84 draped over the special link 52 thereby closing the flow of water therethrough. The cam handle 82 extends generally vertically downwardly through the open slot 66 in the plate 58 between the hose loops when the clamping means 50 is in the abovedescribed operative position.

Figure 5:
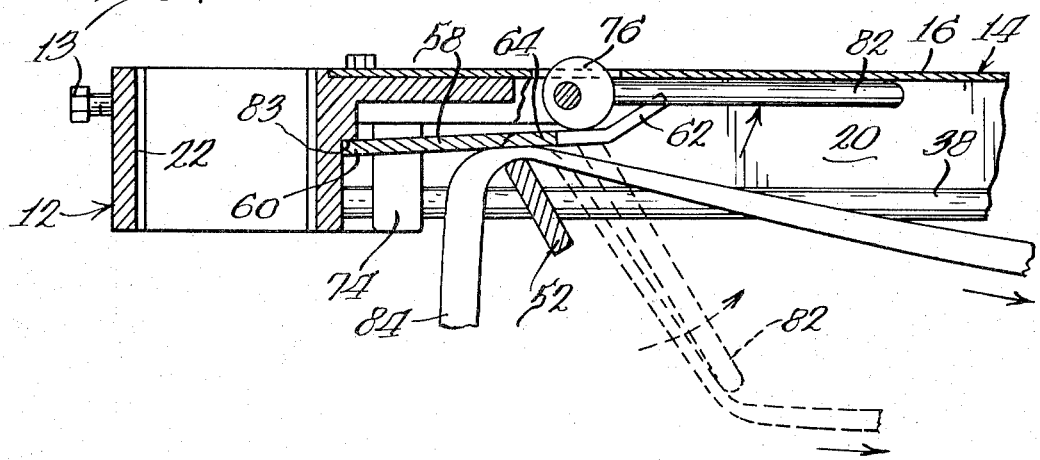
FIG. 5 is a fragmentary view similar to FIG. 3 showing the clamping means in position prior to applying the clamping means upon the hose.

FIG. 5 shows the clamping means 50 in an unclamped position whereby water is permitted to flow through the hose section 84. The cam handle 82 is in a generally horizontal position.

The clamping means 50 is brought from a clamped or operative position as shown in FIG. 3 to a released or inoperative position as shown in FIG. 5 by causing the cam handle 82 to swing upwardly in a downstream direction. This is accomplished by a force exerted on the handle 82 by the adjacent hose loop during the straightening when the hose 28 is being pulled from the rack.

When it becomes necessary to use the hose 28 on this rack, the water is turned on at the water supply valve 24 and immediately the hose 28 fills up with water to the special link 52 to the point 86 (FIG. 3). In changing from a flat section to a filled round section, the hose 28 exerts pressure on the rearward side of the special link 52, causing its lower edge to cant forward and rock on the bottom surface of the finger 56 to a position substantially that shown in FIG. 5. This further tends to provide tighter wedging action, preventing flow beyond this link 52 and provide a strong seal. With the water turned on, the user then grasps the nozzle 30 and proceeds to lay the hose 28 out by pulling on the hose itself. This causes the outer links 34 to slide out to the end of the rails and then swing downwardly in a horizontal arc successively releasing loops of hose. As soon as each wire link's free end 42 is removed from the rail 38, it swings to a vertical position permitting the fold of the hose which it supported to fall free. Each link in succession must overcome the resistance of the spring finger 48 ensuring that the hose loops are released in sequence, not all at once.

The loop of hose over the link 52, being clamped tightly, will remain in position until the cam 76 is released. The straightening of the hose 28 itself under influence of the pull lengthwise of the hose will serve to do the releasing. The loop just beyond the link 52 will eventually begin to straighten when the hose 28 itself is substantially all laid out straight. As this loop also straightens, the handle 82 on the cam 76 is pivoted upwardly (in FIG. 3, counterclockwise) which serves to loosen the clamping action. With this loop of hose straightened almost to horizontal, the cam 76 would be entirely released and the link 52 free to slide off the end of the rails 36 and 38 releasing the last loop of the fire hose 28. Water pressure will aid the movement of the link 52 outwardly from under the plate 58 and outwardly over the rails 36 and 38. The slot 54 in the link is large enough to effect an early release of the last hose loop. As the free end 56 of the link 52 moves forwardly along the rail 38 due to the water pressure, it will be denied the support of rail 38 and will immediately drop to a vertical position. On the dropping of the special link 52, the fold previously supported is thereby allowed to fall.

When it is desired, after use of the hose, to restore the condition shown in FIGS. 1 and 3, the water valve 24 is closed and the hose 28 drained of water and is smoothed out to assume a substantially flat configuration. A portion of the hose near the base 12 of the rack is folded to make the first fold. The pressure holding link 52 is hand-raised to rotate it to the horizontal position shown in FIG. 4 with the first hose looped over and supported by this link. The loop is moved toward the base 12 as closely as possible, at least to repose well under the plate. While holding the special link 52 in this position, the cam handle 82 is swung downwardly thereby firmly wedging the clamping means 50 in the position shown in FIG. 3. As illustrated in FIG. 1, the remaining length of hose 28 is then folded one fold at a time to produce many folds through the loops as there are links 34. Each link 34 is inserted within the appropriate fold and the links 34 are restored to their horizontal positions with their free ends 42 supported by the rail 38.

I claim:

1. In a fire fighting water hose rack of the type capable of storing a long collapsed hose compactly in upright folded loops draped over a plurality of temporary support links which sequentially release such loops as the hose is withdrawn from the rack outer end first, the rack being mountable adjacent a valved water supply pipe with the hose connected downstream of the valve, clamping means for temporarily closing off the flow of water through the loops until the hose is drawn out of the rack and substantially straightened comprising:

a pressure plate extending over the link closest to the water supply;

a cam member above and in operative relation to the pressure plate, said cam member being mounted for swinging movement about an axis to move the plate toward the link and pinch a hose section draped over said link thereby closing off the flow of water through said hose section; and a handle on said cam member extending downwardly between the hose loops and swingable upwardly in a downstream direction in response to a force exerted on the handle by the adjacent hose loop during straightening when the hose is being pulled from the rack, said cam member and handle being arranged relative to the pressure plate to clamp the hose between said plate and underlying link when the handle is in said downward position and release said clamping action on the hose when the handle is swung upwardly by the pulling of the hose from the rack.

2. The hose rack of claim 1 wherein said cam member is a cylinder eccentrically mounted for rotation against the upper side of the pressure plate.

3. The hose rack of claim 1 including a base surrounding the water supply pipe and wherein said pressure plate is elongated and has one end loosely engaging under the base, has a free end opposite such engaged end and a bearing portion intermediate the ends overlying the first link.

4. The hose rack of claim 3 wherein said pressure plate includes an elongated slot extending from the free end towards the bearing portion for admitting the cam handle therein when swung to the downward position, said cam member being mounted over said bearing portion.

5. The hose rack of claim 3 including a pair of parallel spaced apart horizontal rails extending outwardly from the base over which the temporary support links are slidably mounted so that at least one end of each link will fall away from its supporting rail when said link has been moved to the downstream end of said rails by the pulling of the hose from the rack.

* * * * *